United States Patent [19]
Moore

[11] 4,086,168
[45] Apr. 25, 1978

[54] DISC FILTER CHUTE LINER

[75] Inventor: Richard D. Moore, New Boston, N.H.

[73] Assignee: Plastic Techniques, Inc., New Boston, N.H.

[21] Appl. No.: 622,870

[22] Filed: Oct. 16, 1975

[51] Int. Cl.² .............................................. B01D 33/22
[52] U.S. Cl. ..................... 210/330; 210/332; 220/470
[58] Field of Search ............... 210/358, 332, 334, 397, 210/398, 402, 541, 330, 400, 401, 403, 404, 542; 55/435, 436; 220/63 R, 64; 217/3 CB, 3 R

[56] References Cited
U.S. PATENT DOCUMENTS

| | | | |
|---|---|---|---|
| 1,550,293 | 8/1925 | Walker | 210/402 X |
| 2,348,622 | 5/1944 | Heilman | 220/63 R |
| 2,797,843 | 7/1957 | Orlins | 220/63 R |
| 3,034,647 | 5/1962 | Giesse | 55/435 X |
| 3,087,645 | 4/1963 | Eddy et al. | 220/63 R |
| 3,471,026 | 10/1969 | Riker | 210/334 X |
| 3,527,439 | 9/1970 | Lawmaster | 220/63 R X |
| 3,734,340 | 5/1973 | Ippolito et al. | 220/63 R |
| 3,915,329 | 10/1975 | Zaks | 220/63 R X |
| 3,934,748 | 1/1976 | Racz | 220/63 R X |

Primary Examiner—Frank W. Lutter
Assistant Examiner—Richard L. Chiesa
Attorney, Agent, or Firm—Carella, Bain, Gilfillan & Rhodes

[57] ABSTRACT

A disc filter chute liner for being inserted in the passageway formed in a cake discharge chute of a disc filter and for being interposed between the cake discharge chute and cake passing therethrough and for preventing the cake from adhering to the cake discharge filter, the disc filter chute liner being provided with smooth and slick internal surfaces with respect to the cake whereby the cake passing through the liner will not adhere to the smooth and slick surfaces and thereby in turn will not adhere to the cake discharge chute.

1 Claim, 2 Drawing Figures

DISC FILTER CHUTE LINER

BACKGROUND OF THE INVENTION

This invention relates generally to the field of disc filters, and in particular relates to liner means for being inserted in the discharge chute of a disc filter for preventing cake passing through the cake discharge chute from adhering thereto.

As is known to those skilled in the disc filter and filtration arts, disc filters are commonly used to filter or separate solids, or semi-solids (commonly referred to as "cake") from liquids such as water. For example, disc filters are commonly used to filter or separate wood pulp from water, and to separate solid or semi-solid matter (i.e. "cake") such as taconite, copper, coal, cement, and other solids or semi-solids, from carrier liquids.

As is further known to those skilled in the disc filter art, the disc filters include a plurality of filter discs each comprised of a series of generaly fan-shaped filter sectors secured together to provide the filter disc. As is further known to those skilled in the disc filter art, a cake discharge chute is typically provided between adjacent disc filters for receiving cake falling off of the disc filters and for providing a passageway for such cake to a conveyor belt, or other cake removal means, located below the disc filter.

The typical cake which falls off of the disc filters and passes through the cake discharge chute is sticky or tacky and hence a portion of the cake passing through the cake discharge chute adheres to the walls or internal surfaces of the chute as well as the sharp corners between the walls of the cake discharge chute. In time, the cake adhering to the walls and corners of the cake discharge chute can clog the cake discharge chute and hence effectively bring the filtering or separation process of the disc filter to a halt. This problem of clogging of cake discharge chutes is one that has persisted and preplexed the disc filter art.

Another problem that has persisted is that of conveyor belt sidetracking which occurs when large portions of clogged cake material are released from the cake discharge chute by the disc filter operator, such as by the disc filter operator striking or shaking the cake discharge chute, whereupon large portions of clogged cake material are suddenly released and fall upon the conveyor belt positioned therebelow causing conveyor belt sidetracking.

SUMMARY OF THE INVENTION

The present invention comprises a disc filter chute liner for being inserted in a cake discharge chute and for being interposed between the walls or internal surfaces of the cake discharge chute to prevent cake from adhering to the walls or internal surfaces and corners of the cake discharge chute.

Such disc filter liner is generally hollow and provided with an internal surface defining a passageway therethrough for the cake and which internal surface is smooth and slick with respect to the cake thereby preventing the cake from adhering to the internal surface of the liner means and hence from adhering to the walls or internal surfaces of the cake discharge chute. Further, the disc filter chute liner of the present invention is formed integrally with smooth internal transitional corners between the surfaces of the internal walls thereby further preventing cake from adhering to the corners and being formed integrally, or of one piece construction, seams are eliminated which can otherwise cause cake to collect and clog.

Accordingly, since the internal surface of the disc filter chute liner according to the present invention prevents cake from adhering to its internal surface and hence from adhering to the cake discharge chute, the above-noted problem of cake discharge chute clogging is prevented and since the cake passes smoothly and continuously through the cake discharge chute of the present invention, the above-noted problem of conveyor belt sidetracking is also eliminated.

Additionally, the disc filter chute liner of the present invention may be provided with a funnel-like upper portion which overhangs the upper edges of the disc filter chute and facilitates the entrance of cake into the disc filter chute liner, and still further, the disc filter chute liner of the present invention may be provided with a tapered lower portion which further facilitates a smooth and continuous discharge of cake from the disc filter chute liner.

DESCRIPTION OF THE INVENTION

Figure 1:
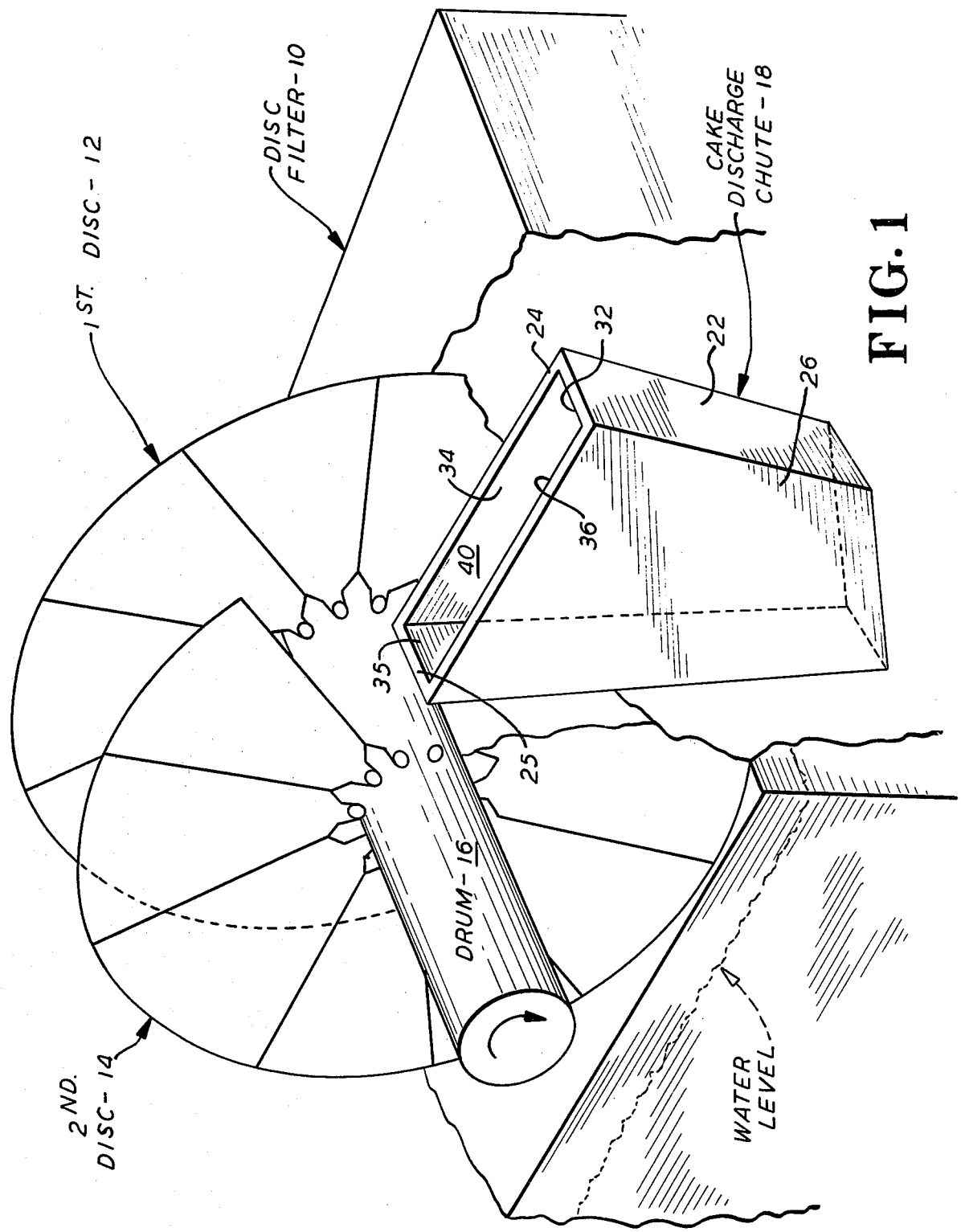
FIG. 1 is a diagrammatic illustration of a portion of a typical disc filter and illustrating, diagrammatically, a cake discharge chute.

A typical prior art disc filter, indicated by general numerical designation 10, is shown diagrammatically and, as understood by those skilled in the art, includes a plurality of discs such as first disc 12 and second disc 14. The discs are mounted rotatably on a drum 16 and displaced axially from each other and separated by a typical cake discharge chute 18 disposed between the first and second discs 12 and 14 and which cake discharge chute is for receiving cake which falls off of the sides of the discs and which cake discharge chute is for providing a controlled passageway for the cake to follow and discharge upon various means for conveying away the cake, such as for example a conveyor belt (not shown) suitably located below the cake discharge chute.

Referring specifically to the cake discharge chute 18 of FIG. 1, it will be noted that the cake discharge chute is provided with a plurality of walls 22, 24, 25 and 26 which are provided with internal surfaces 32, 34, 35 and 36 respectively. The internal surfaces 32, 34, 35 and 36 define a passage through the cake discharge chute indicated by general numerical designation 40. It will be noted, from FIG. 1, that the internal surfaces meet in sharp corners, and hence as taught above, a portion of the cake falling off of the discs 12 and 14, typically being sticky or tacky, adheres to the internal surfaces 32, 34, 35 and 36, and the corners, of the cake discharge chute 18 and such adhering cake can clog the cake discharge chute.

Figure 2:
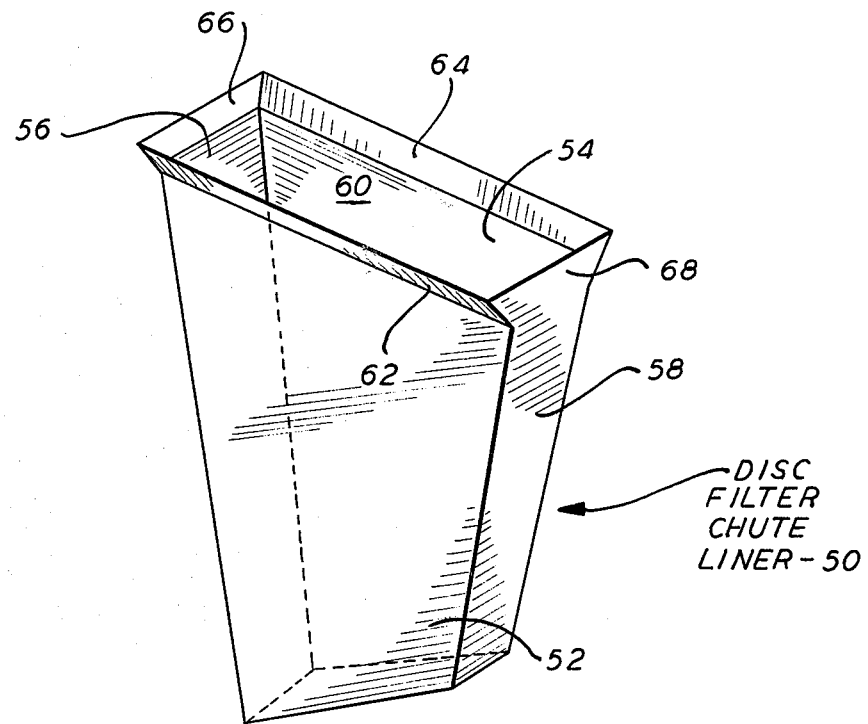
FIG. 2 is a diagrammatic illustration, in perspective, of a disc filter chute liner according to the present invention.

Referring now to FIG. 2, there is shown a disc filter chute liner indicated by general numerical designation 50 which embodies the present invention.

As may be noted from FIG. 2, the disc filter chute liner 50 is generally hollow and is for being inserted in the passage 40 provided in the cake discharge chute 18 shown in FIG. 1. The disc filter chute liner 50 is for being disposed between the internal surfaces 32, 34, 35, and 36 and the sharp corners of the cake discharge chute and cake passing therethrough.

More specifically, and as is illustrated diagrammatically in FIG. 2, the disc filter chute liner 50 is provided with a pair of opposed trapezoidally shaped side walls 52 and 54 and a pair of opposed rectangular shaped end walls 56 and 58.

It will be understood by those skilled in the art that unlike as appears by the necessity of straight lines used in the diagrammatic drawing of FIG. 2, the disc filter chute liner 50 of the present invention is provided with smooth or rounded external transitional corners between the external and internal surfaces of the walls 52, 54, 56 and 58 of the disc filter chute liner 50.

It will further be understood that the external surfaces and smooth transitional corners therebetween of the walls of the disc filter chute liner 50 are formed generally complementary with respect to the configuration of the internal surfaces 32, 34, 35 and 36, and the sharp corners, of the walls of the cake discharge chute 18. Hence, upon the insertion of the disc filter chute liner 50 into the cake discharge chute 18, the external surfaces of the disc filter chute liner substantially closely engage the internal surfaces of the cake discharge chute.

Referring again specifically to FIG. 2, it will be further understood by those skilled in the art that the internal surfaces of the disc filter chute liner 50 are also provided with smooth or rounded transitional corners therebetween (unlike the straight lines of the diagrammatic illustration) thereby eliminating sharp corners between the internal surfaces of the disc filter chute liner. The internal surfaces and smooth transitional corners therebetween of the disc filter chute liner define a passage therethrough indicated by general numerical designation 60; upon the disc filter chute liner being inserted in the cake discharge chute the cake passes through the passage 60.

It will be further understood by those skilled in the art, and in accordance with the further teaching of the present invention, that the disc filter chute liner 50 of the present invention is made of a suitable predetermined material, such as for example cross-linked polyethylene, whereby the internal surfaces of the disc filter chute liner 50 are made to be smooth and slick with respect to the cake passing through the passage 60.

The smooth and slick internal surfaces of the walls 52, 54, 56 and 58 of the disc filter chute liner 50 prevent such cake from adhering thereto and thereby also prevent the cake from adhering to the internal surfaces 32, 34, 35, and 36, and sharp corners, of the cake discharge chute 18. Thus, cake discharge chute clogging is eliminated and a more smooth and continuous flow or discharge of cake through the cake discharge chute is provided and hence conveyor belt sidetracking is eliminated.

Referring again to FIG. 2, it will be noted that the disc filter chute liner 50 of the present invention may further be provided with a plurality of generally trapezoidally shaped upper section portions 62, 64, and 66 which are formed integrally with each other and with the upper edges of the opposed side walls and end walls 52 and 54 and 56 and 58, respectively. Further, it will be noted that the generally trapezoidally shaped upper section portions are also formed integrally with a generally trapezoidally shaped upper portion 68 of the rectangular end wall 58. The trapezoidally shaped upper sections are formed, as may be noted, at a predetermined outwardly flaring angle (e.g. 45°) with respect to the side walls and the end wall 56 and provides the liner means with a funnel-like upper portion for overhanging the upper edges of the walls 22, 24, 25 and 26 of the cake discharge chute 18 and facilitate the entrance of cake into the disc filter chute liner 50.

Further, the disc filter chute liner of the present invention may be further advantageously provided with a tapered lower portion as illustrated diagrammatically in FIG. 2 by forming the rectangularly shaped end wall 58 smaller in size than the end wall 56 and by disposing the trapezoidally shaped side walls 52 and 54 such that the lower edges thereof are at an angle with respect to the horizontal. Such provides the lower portion of the disc filter chute liner 50 with a tapered lower portion which in turn facilitates discharge of the cake through and from the disc filter chute liner.

It will be further understood by those skilled in the art that the disc filter chute liner 50 of the present invention may be made advantageously by rotational molding and from cross-linked polyethylene material as noted above, although the present invention is not so limited.

Disc filter chute liners according to the present invention have been used advantageously to line and prevent clogging of cake discharge chutes of disc filters utilized in taconite, copper, coal, cement and other plant operations.

It will be further understood by those skilled in the art that many variations and modifications may be made in the present invention without departing from the spirit and the scope thereof.

What is claimed is:

1. A disc filter chute liner for lining a cake discharge chute, the cake discharge chute provided with a plurality of walls the open upper ends of which define a cake inlet and the open lower ends of which define a cake outlet and said walls having internal surfaces interconnecting said cake inlet and outlet and defining a passage through said cake discharge chute through which cake passes and said internal surfaces meeting in sharp corners and a portion of the cake passing through said cake discharge chute adhering to said internal surfaces of said walls and to said sharp corners, and said walls also provided with upper edges defining said cake inlet, comprising:

generally hollow liner means provided with a plurality of walls having open upper and lower ends and for being inserted in said cake discharge chute with said open upper and lower ends thereof being generally coincident with said cake inlet and outlet, respectively, of said cake discharge chute and with said walls thereof being disposed between said internal surfaces of said walls and said sharp corners of said cake discharge chute and said cake passing therethrough;

said liner means provided with a pair of opposed trapezoidally shaped side walls and a pair of opposed rectangularly shaped end walls, said side walls and end walls being formed integrally and provided with external surfaces having smooth external transitional corners therebetween and said external surfaces and external transitional corners being generally complementary in configuration to said internal surfaces and sharp corners of said walls of said cake discharge chute, and said side and end walls of said liner means provided with upper edges and lower edges;

said side and end walls of said liner means provided with internal surfaces having smooth transitional corners therebetween and which internal surfaces define a passage through said liner means through which said cake passes upon said liner means being inserted in said cake discharge chute;

said liner means made of a predetermined material providing said internal surfaces and said smooth internal transitional corners of said opposed side and end walls thereof with smooth and slick internal surfaces with respect to said cake and said smooth and slick internal surfaces and corners for preventing said cake from adhering thereto and thereby also for preventing said cake from adhering to said internal surfaces and sharp corners of said walls of said cake discharge chute;

said liner means further provided with a plurality of generally trapezoidally shaped upper section portions formed integrally with each other and with said upper edges of said opposed side walls and one of said end walls and with a generally trapezoidally shaped upper portion of said other end wall, and said trapezoidally shaped upper sections being formed at a predetermined outwardly flaring angle with respect to said side walls and said one end wall and defining said open upper end of said liner means and for providing said liner means with a funnel-like upper portion for overhanging said upper edges of said side walls of said cake discharge chute and said funnel-like upper portion for facilitating the entrance of said cake into said liner means; and one of said rectangularly shaped end walls of said liner means being smaller than the other rectangularly shaped end wall and said trapezoidally shaped side walls of said liner means being disposed such that said lower edges thereof are at an angle with respect to the horizontal thereby providing said liner means with a tapered lower portion defining said open lower end thereof and said tapered lower portion facilitating discharge of said cake from said liner means.

* * * * *